United States Patent
Reese

(10) Patent No.: US 7,802,007 B2
(45) Date of Patent: Sep. 21, 2010

(54) TECHNIQUES FOR PROVIDING CONNECTIONS TO SERVICES IN A NETWORK ENVIRONMENT

(75) Inventor: David Byrne Reese, Oakland, CA (US)

(73) Assignee: Salesforce.com, Inc., San Francisco, CA (US)

( * ) Notice: Subject to any disclaimer, the term of this patent is extended or adjusted under 35 U.S.C. 154(b) by 1630 days.

(21) Appl. No.: 10/849,602

(22) Filed: May 19, 2004

(65) Prior Publication Data

US 2006/0015353 A1    Jan. 19, 2006

(51) Int. Cl.
*G06F 13/00* (2006.01)

(52) U.S. Cl. .................. 709/232; 709/230; 709/246; 709/227

(58) Field of Classification Search .......... 709/217, 709/218, 238, 239, 220, 221, 226, 227, 230, 709/232, 246; 705/8
See application file for complete search history.

(56) References Cited

U.S. PATENT DOCUMENTS

| | | | |
|---|---|---|---|
| 5,222,234 A | 6/1993 | Wang et al. ............... 707/3 |
| 5,255,389 A | 10/1993 | Wang ........................ 707/10 |
| 5,333,312 A | 7/1994 | Wang ........................ 707/10 |
| 5,446,903 A | 8/1995 | Abraham et al. | |
| 5,734,837 A | 3/1998 | Flores et al. | |
| 5,850,518 A | 12/1998 | Northrup ............... 395/200.33 |
| 5,917,489 A | 6/1999 | Thurlow et al. | |
| 6,091,714 A | 7/2000 | Sensel et al. ............. 370/260 |
| 6,115,690 A | 9/2000 | Wong | |
| 6,243,747 B1 * | 6/2001 | Lewis et al. ............. 709/220 |
| 6,289,382 B1 | 9/2001 | Bowman-Amuah | |
| 6,397,254 B1 | 5/2002 | Northrup ................. 709/227 |
| 6,421,705 B1 | 7/2002 | Northrup ................. 709/203 |
| 6,446,069 B1 | 9/2002 | Yaung et al. | |
| 6,449,634 B1 | 9/2002 | Capiel | |
| 6,529,489 B1 | 3/2003 | Kikuchi et al. ............. 370/331 |
| 6,546,413 B1 | 4/2003 | Northrup ................. 709/200 |
| 6,549,944 B1 | 4/2003 | Weinberg et al. | |

(Continued)

OTHER PUBLICATIONS

Greef, Arthur, "Partner Interface Process Technical Architecture", © 1998, RossettNet/PIP Technical Architecture.doc, pp. 1-12.

(Continued)

*Primary Examiner*—Kenneth R Coulter
(74) *Attorney, Agent, or Firm*—Weaver Austin Villeneuve & Sampson LLP

(57) ABSTRACT

Methods and apparatus for facilitating consumption of services via a services network are described. Access is provided to a services directory which identifies a plurality of services and at least one connector for facilitating consumption of each of the services via the network. Each connector is operable to mediate communication protocol and business policy differences between a first network end point associated with the corresponding service and a second network end point associated with a consumer of the service. For each of selected ones of the connectors, information accessible via the services directory is provided regarding how to use the connector to consume the corresponding service. For each of selected ones of the services, access to a connector design process is provided via the services directory. The connector design process is operable to facilitate creation of a new connector for the corresponding service, and to specify at least one business process for mediating the business policy differences.

35 Claims, 11 Drawing Sheets

U.S. PATENT DOCUMENTS

| | | | |
|---|---|---|---|
| 6,671,713 B2 | 12/2003 | Northrup | 709/203 |
| 6,671,746 B1 | 12/2003 | Northrup | 712/200 |
| 6,721,747 B2 | 4/2004 | Lipkin | |
| 6,850,893 B2 | 2/2005 | Lipkin et al. | |
| 6,871,231 B2 | 3/2005 | Morris | |
| 6,957,199 B1 | 10/2005 | Fisher | |
| 7,072,983 B1 | 7/2006 | Kanai et al. | |
| 7,100,195 B1 | 8/2006 | Underwood | |
| 7,107,445 B2 | 9/2006 | Trapp et al. | |
| 7,251,666 B2 | 7/2007 | Morinville | |
| 7,574,511 B2 * | 8/2009 | Pujol et al. | 709/229 |
| 2002/0073080 A1 | 6/2002 | Lipkin | |
| 2002/0091533 A1 | 7/2002 | Ims et al. | |
| 2003/0033191 A1 | 2/2003 | Davies et al. | |
| 2003/0041178 A1 | 2/2003 | Brouk et al. | 709/303 |
| 2003/0058277 A1 | 3/2003 | Bowman-Amuah | 345/765 |
| 2003/0115179 A1 * | 6/2003 | Prabakaran et al. | 707/1 |
| 2003/0144860 A1 | 7/2003 | Casati et al. | |
| 2004/0117371 A1 | 6/2004 | Bhide et al. | |
| 2004/0162741 A1 * | 8/2004 | Flaxer et al. | 705/7 |
| 2004/0193606 A1 | 9/2004 | Arai et al. | |
| 2004/0254934 A1 | 12/2004 | Ho et al. | |
| 2005/0004893 A1 | 1/2005 | Sangroniz | |
| 2005/0076049 A1 | 4/2005 | Qubti et al. | |
| 2005/0131941 A1 | 6/2005 | Dettinger et al. | |
| 2005/0138031 A1 | 6/2005 | Wefers | |
| 2005/0138210 A1 | 6/2005 | Shkvarchuk | |
| 2005/0165822 A1 | 7/2005 | Yeung et al. | |
| 2005/0171930 A1 | 8/2005 | Arning et al. | |
| 2005/0204048 A1 * | 9/2005 | Pujol et al. | 709/229 |
| 2005/0223009 A1 | 10/2005 | Powers et al. | |
| 2005/0228863 A1 * | 10/2005 | Palmeri et al. | 709/205 |
| 2005/0234928 A1 * | 10/2005 | Shkvarchuk et al. | 707/100 |
| 2005/0234964 A1 | 10/2005 | Batra et al. | |
| 2006/0015499 A1 | 1/2006 | Clissold et al. | |
| 2006/0031194 A1 | 2/2006 | Ghazalch | |
| 2006/0069717 A1 * | 3/2006 | Mamou et al. | 709/203 |
| 2006/0074703 A1 | 4/2006 | Bhandarkar | |
| 2006/0074915 A1 | 4/2006 | Bhandarkar | |
| 2006/0074933 A1 | 4/2006 | Barac et al. | |
| 2006/0074969 A1 | 4/2006 | Barac et al. | |
| 2006/0085473 A1 | 4/2006 | Thormaehlen et al. | |
| 2006/0161549 A1 | 7/2006 | Bartkowiak et al. | |
| 2007/0136294 A1 | 6/2007 | Morinville | |
| 2007/0208606 A1 | 9/2007 | MacKay et al. | |

OTHER PUBLICATIONS

Stross, Kenneth, "Managed B2B Infrastructure Technical Architecture", © Jul. 31, 2000, Transact Technical Architecture, pp. 1-14.

"A Global Infrasture for the Guaranteed Delivery of B2B Transactions over the Internet", Slam Dunk Networks, © 2000, pp. 1-18.

ipo.com, Internet Document, URL:http://www.ipo.com/venture/pcprofile.asp?p+IPO&pc+20323, p. 1.

CrossWeave Company, Internet Document, © 2001, URL:http://www.crossweave.com/company_overview.html, p. 1.

GlueCode/Our Mission Vision, Internet Document, URL:http://www.gluccode.com/company/mission_vision.html, p. 1.

Viquity/Press Release, "Viquity Demonstrates Power of Hub Technology In ebXNL Proof-of-Concept", Dec. 12, 2000, pp. 1-2.

Festa, Paul, "Start-up gains Netscape funding, Microsoft engineers", NET News.com, Sep. 10, 2000, pp. 1-2.

US Office Action dated Mar. 26, 2008 issued in U.S. Appl. No. 10/742,513.

US Office Action dated Apr. 11, 2007 issued in U.S. Appl. 11/014,149.

US Office Action dated Oct. 1, 2007 issued in U.S. Appl. No. 11/014,149.

US Office Action dated May 23, 2008 issued in U.S. Appl. No. 11/014,149.

US Examiner's Interview Summary dated Oct. 8, 2008 issued in U.S. Appl. No. 11/014,149.

US Office Action Final dated Dec. 17, 2008 issued in U.S. Appl. No. 11/014,149.

US Office Action (Examiner Interview Summary) dated Mar. 9, 2009 issued in U.S. Appl. No. 11/014,149.

US Office Action (Advisory Action) dated Mar. 23, 2009 issued in U.S. Appl. No. 11/014,149.

Moberg, Dale and Drummond, Rik (2005) Mime-Based Secure Peer-to-Peer Business Data Interchange Using HTTP, Applicability Statement 2 (AS2); Network Working Group, Request for Comments: 4130, Category: Standards Track, Copyright, The Internet Society, Jul. 2005, 47 pages.

US Office Action dated Aug. 31, 2009 issued in U.S. Appl. No. 11/021,716.

US Examiner Interview Summary dated Dec. 2, 2009 issued in U.S. Appl. No. 11/021,716.

US Office Action dated Jun. 17, 2009 issued in U.S. Appl. No. 11/014,149.

US Examiner Interview Summary dated Sep. 11, 2009 issued in U.S. Appl. No. 11/014,149.

US Office Action Final dated Dec. 8, 2009 issued in U.S. Appl. No. 11/014,149.

* cited by examiner

Company | Developer Resources | Feedback [search directory] [Go]

GRAND CENTRAL
COMMUNICATIONS

*anywhere from here...*

| Home | Directory | Messaging | My Organization | Manage Services | Design Processes | Relationships | Reports |

Public Directory    Service Provider Directory    My Directory    Partner Directory                        Logout byrnereese  Help :: Public Directory > Some Service Category

Search [          ]  [Search]         Submit a Service to the Directory

This is a category description. It goes here. And it should be short. Concise. And to the point.

ADDITIONAL CATEGORIES

- Auctions (8)
- EDI (3)
- Financial (4)
- Logistics (12)

- Lotteries (1)
- Processes (78)
- Retail (0)
- Survey (4)

Test Drive the Network [?]

Sign Up Today & Get
25MB/Month FREE
(surface for anon users only)

Syndicate the Directory [?]

Incorporate our Business Services Directory into your own web site or application today!

SERVICES

- htmail -- Do It Yourself Email Marketing  ✓ Featured Service
  Manage your e-mail marketing - Service listed on behalf of frameWERKS.
  Provider: Grand Central's Public Services
  Connectors: Synchronous SOAP | Asynchronous SOAP | FTP

- I Like This the Most  ✓ Featured Service  📥 Import Process
  This is a description of a service that is a little longer. A lot of text goes here to inform people about the nature of this service.
  Provider: Grand Central's Public Services
  Connectors: Synchronous SOAP | Asynchronous SOAP

- Use this Service
  Manage your e-mail marketing - Service listed on behalf of frameWERKS.
  Provider: Grand Central's Public Services
  Connectors: Synchronous SOAP | Asynchronous SOAP | SAP

- Use this Service
  Manage your e-mail marketing - Service listed on behalf of frameWERKS.
  Provider: Grand Central's Public Services
  Connectors: AS2

[XML]

Submit a Service to the Directory

About Us | Network Usage Agreement | Feedback

© 1999-2004, Grand Central Communications, Inc. All rights reserved.

Fig. 3

Company | Developer Resources | Feedback | search directory

GRAND CENTRAL
COMMUNICATIONS

*anywhere from here...*

| Home | Directory | Messaging | My Organization | Manage Services | Design Processes | Relationships | Reports |

Public Directory    Service Provider Directory    My Directory    Partner Directory      Logout byrnereese   Help

Public Directory > Some Service Category > Some Service > Some Connector

Directory Quick Search [ ] Go

Service Name: htmail -- Do It Yourself Email Marketing
Connector Name: Asynchronous SOAP
Service Provider: Grand Central's Public Services Customize Connector

HOW TO USE THIS CONNECTOR

Every service and business process on the Network can be invoked asynchronously. Grand Central uses a poll-based style of asynchronous messaging. In this style of asynchronous messaging, messages are *posted* to the network and a correlation ID is synchronously returned to the client. This correlation ID, also referred to as a "token," is used in subsequent calls to the network to poll for the associated response. Once the response message has been retrieved from the network by polling, the message is then acknowledged with a final call to the network.

Authentication

Users must always authenticate themselves when messaging over the network. This is to better track who is sending messages and to whom. Authentication is achieved through the use of an HTTP Authorization Header, or a x509 certificate.

When using the HTTP Authorization header, the value must be set to a base64 encoded username and password, where the username is a combination of your username and organization domain delimitted by an '@' sign (i.e. johndoe@mydomain.com).

*Consult your toolkit's documentation in order to learn how to properly present authentication credentials to network entities.*

URLs

- Post: http[s]://pop.grandcentral.com/sync/soaprpc/
- Poll: http[s]://pop.grandcentral.com/sync/poll
- Acknowledge: http[s]://pop.grandcentral.com/sync/ack

Schemas

- Post SOAP Header
- Poll
- Delivery SOAP Header
- Postmark SOAP Header

About Us | Network Usage Agreement | Feedback

© 1999-2004, Grand Central Communications, Inc. All rights reserved.

TECHNIQUES FOR PROVIDING CONNECTIONS TO SERVICES IN A NETWORK ENVIRONMENT

BACKGROUND OF THE INVENTION

The present invention relates to enabling interaction among a plurality of services in a network and, more specifically, providing connectors to facilitate such interaction.

The vast majority of application services today are provided according to a computing model which is characterized by several limitations. According to this model, a user wishing to access any of a number of application services employs a client machine (e.g., a desktop computer) to generate a request for a particular service. This is typically facilitated by a browser operating on client machine. The browser is an application which communicates via a network (e.g., a public or private LAN or WAN) with a server which manages access to the application services. What is typically viewed by the user is a page (e.g., an html page) which is generated by the server and delivered over the network for display in the user's browser.

The server in this model typically employs a three-tiered architecture to manage access to the associated application services. A portal layer governs display of information presented in the client's browser. An application server layer manages access to the application services on a high level, but because of the varied nature of the application services, an integration layer is required to normalize the communications with these services. That is, the integration layer, which is the primary focus of Enterprise Application Integration (EAI) and Business-to-Business (B2B) providers, facilitates connection with and communication among the application services themselves. Unfortunately, the great variety of application services and the highly individualized nature of EAI and B2B solutions coupled with the limitations of this computing model have made EAI and B2B economically impracticable approaches for many enterprises.

In conjunction with the proliferation of Web services there has been movement toward and open, standards-based approaches to platform interoperability using standards such as XML, SOAP, BPEL, WSDL, UDDI, etc. However, the problem of getting disparate platforms to interact is still largely solved using an ad hoc approach involving considerable expense on the part of any business wishing to take advantage of the services available on the Web as well as a considerable duplication of effort.

SUMMARY OF THE INVENTION

According to the present invention, methods and apparatus for facilitating consumption of services via a services network are provided. According to a specific embodiment, access is provided to a services directory which identifies a plurality of services and at least one connector for facilitating consumption of each of the services via the network. Each connector is operable to mediate communication protocol and business policy differences between a first network end point associated with the corresponding service and a second network end point associated with a consumer of the service. For each of selected ones of the connectors, information accessible via the services directory is provided regarding how to use the connector to consume the corresponding service. For each of selected ones of the services, access to a connector design process is provided via the services directory. The connector design process is operable to facilitate creation of a new connector for the corresponding service, and to specify at least one business process for mediating the business policy differences.

According to another embodiment, a services network is provided for providing access to a plurality of services by a plurality of users having associated client machines. Each of the plurality of users is associated with one of a plurality of independent enterprises. The plurality of services are controlled by a plurality of independent service providers and employ a plurality of interfaces at least some of which are not directly interoperable. At least one data store has a first directory stored therein which maps an identity corresponding to each of the users to a policy framework which defines access policies relating to the services. The identity for each user identifies the associated enterprise. The at least one data store also has a second directory stored therein which identifies the plurality of services and at least one connector for facilitating consumption of each of the services via the network. Each connector is operable to mediate communication protocol and business policy differences between a first end point on the network associated with the corresponding service and a second end point on the network associated with a consumer of the service. At least one computing device is operable to connect with each of the client machines and each of the interfaces associated with the services, and to selectively facilitate interaction among client machines and the services with reference to the directory and the policy framework, thereby enabling the users associated with different ones of the enterprises to independently access the plurality of services using the services network. The at least one computing device is further operable to provide access to the second directory and, for each of selected ones of the connectors, provide information accessible via the second directory regarding how to use the connector to consume the corresponding service.

A further understanding of the nature and advantages of the present invention may be realized by reference to the remaining portions of the specification and the drawings.

BRIEF DESCRIPTION OF THE DRAWINGS

FIGS. 3-7, 9 and 10 are representations of graphical user interfaces for illustrating a process by which a user may discover and prepare to consume a service according to various embodiments of the invention.

DETAILED DESCRIPTION OF SPECIFIC EMBODIMENTS

Figure 1:
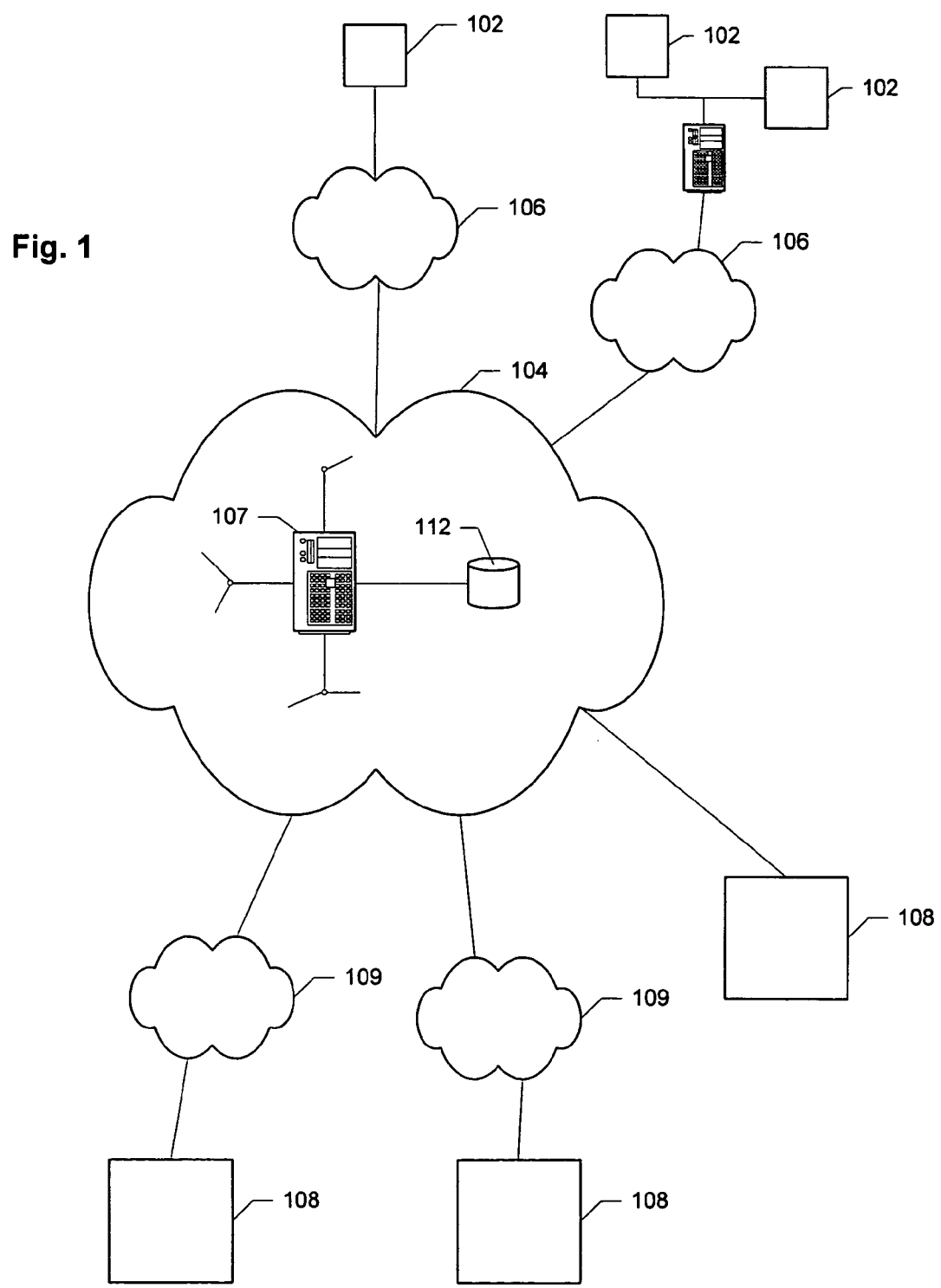
FIG. 1 is a simplified network diagram of a network environment in which embodiments of the present invention may be practiced.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments of the present invention are implemented in a services network which is a message platform having a loosely coupled, service oriented architecture (SOA). One of the main advantages of such an architecture is that it allows communication (e.g., the consumption of services) between network end points and processes to transcend technology or protocol mediation issues. A user or a "service" simply connects to the network and that one connection implicitly connects that user or service (at some level) to every other entity on the network.

As used herein, the term "service" may represent any computer application, process, entity, or device accessible to other applications, processes, entities, or devices through an interface such as an application programming interface (API), user interface, or Internet web user interface by any of a variety of protocols over a network within an entity or over the Internet. A service may also comprise multiple methods or applications on a single device or distributed across multiple devices.

According to various embodiments of the invention, a services network is provided which facilitates such interoperability using a wide variety of Web Services technologies and standards including, for example, SOAP, Web Services Description Language (WSDL), WS-Security, WS-Policy, and Business Process Execution Language (BPEL). The services network mediates the technology differences in data formats, communications protocols and business policies through a set of established and defined processes and policies.

In general, the term Web Services refers to a collection of technology standards which enable software applications of all types to communicate over a network. A Web Service typically facilitates a connection between two applications or services in which queries and responses are exchanged in XML over HTTP. More specifically, the term Web Services implies the implementation of a stack of specific, complementary standards.

Although not specifically tied to any transport protocol, Web services build on Internet connectivity and infrastructure to ensure nearly universal reach and support. In particular, Web services take advantage of HTTP, the same connection protocol used by Web servers and browsers. XML is a widely accepted format for exchanging data and its corresponding semantics. It is a fundamental building block for nearly every other layer in the Web Services stack. The Simple Object Access Protocol (SOAP) is a protocol for messaging between applications. It is based on XML and uses common Internet transport protocols like HTTP to carry its data. Web Services Description Language (WSDL) is an XML-based description of how to connect to and communicate with a particular Web service. A WSDL description abstracts a particular service's various connection and messaging protocols into a high-level bundle and forms a key element of the UDDI directory's service discovery model. Finally, Universal Description, Discovery, and Integration (UDDI) represents a set of protocols and a public directory for the registration and real-time lookup of Web services and other business processes. Various embodiments of the invention employ these and similar technologies.

Referring now to the exemplary diagram of FIG. 1, user platforms 102 (which may be part of an enterprise network) connect with a services network 104 via intervening networks 106. Services network 104 (e.g., using one or more computing devices such as server 107) facilitates access to selected ones of associated services 108 which may be sponsored or provided by network 104, or may comprise application services from third parties. These services may actually reside in the network or be connected via intervening networks (e.g., 109). As mentioned above, network 104 provides transparent connections to and interoperability with a wide variety of services and applications. Services network 104 has a directory capability (represented by database 112) which facilitates management of user identities (e.g., including role and group membership), application service identities, and policies which control which entities in the network can interact, and the manner in which they can interact. It should be noted that this directory capability is different from the services directory described below with which users can discover services in the network they wish to consume.

According to some implementations, the services network employs the directory to manage interactions among the services associated with many independent organizations, each with different access, authentication and encryption technologies. Differences in organizational security policies are handled using a policy framework which mediates the differences. According to some embodiments, each organization is able to configure and enforce access rights with multiple methods of authentication being supported.

According to some implementations, the services network supports WS-Policy, a flexible mechanism which enables enterprises to govern access to the services they have deployed on the services network. Such a mechanism may be employed, for example, to ensure that data are exchanged over encrypted connections to the services network, that user and service identities are verified (using the directory), and that access to a particular service is limited and controlled. According to various implementations, such capabilities are supported using industry standards such as, for example, SSL, IPSEC VPNs, and X.509 digital certificates. A policy framework which may be employed with various embodiments of the invention is described in U.S. Provisional Patent Application No. 60/511,573 for APPARATUS AND METHODS FOR POLICY MANAGEMENT WITHIN A COMPUTER NETWORK filed on Oct. 14, 2003, the entire disclosure of which is incorporated herein by reference for all purposes.

Thus, services network 104 provides a hosted, open, and shareable environment in which related and unrelated entities may provide and consume services using heterogeneous technology.

One approach to facilitating connection to and the consumption of services via such a services network involves separating the messaging function into two different aspects, message delivery and message posting. Message delivery relates to how messages are delivered from the network to a service and requires only that the service provider specify how the service expects to receive messages, i.e., the message format and communication protocol. Message posting relates to how, depending on its type, a service is required to post messages to the network and identify services to be consumed. By decoupling these two aspects of messaging, a consumer of a service need only be able to identify the service to be consumed for the network to successfully mediate the interaction.

In general, facilitating communication between two end points involves solving two problems. The first problem relates to resolving all of the technical connectivity issues to achieve data transfer between the two end points. The realm of this problem involves mediating the differences between authentication protocols, transport protocols, messaging protocols, etc. The above-described approach is highly successful within this realm.

The second problem relates to communicating and mediating differences between business policies associated with the two end points. Examples of such business policies might include imposing legal restrictions on the use of a service (e.g., through a terms of use agreement), execution of a contract, providing advance payment, executing credit checks, etc. Understanding the mappings between the business policies associated with two end point services is important to solving this problem.

An example may be instructive. Suppose a distributor wants access via a services network to a portion of a product catalog maintained by an independent manufacturer. Assume that the manufacturer's protocol is FTP and file format is CSV which is a comma delimited flat file format. Further assume that the distributor employs SOAP and communicates HTTP. The solution to the first problem described above, i.e., the mediation of the technical connectivity issues, can effect transfer of the CSV file to the distributor. However, an additional intervening mechanism which maps the CSV file to the SOAP format required by the distributor is also desirable.

The above-described messaging technique, in which message delivery and message posting are decoupled, may not, by itself, be sufficient for communicating and mediating business policy differences. That is, simply mediating the technical differences between two network end points may not be enough if the delivered payload of the messages is not intelligible to the receiver. Thus, some specific information may need to be provided to the consumer of a service relating to how a connection to a particular service is to be made over a protocol not natively supported by the service to which the consumer wishes to connect.

Therefore, according to the invention, a services network is provided which clearly communicates to the consumer of a particular service how to consume that service. According to one such embodiment, an intuitive directory is provided by which a user may discover a service as well as the technical requirements for consuming that service. Still more specifically, such a directory may provide access to processes which facilitate mapping between the business policies associated with two end points communicating via the services network. A discussion of the nature of such processes and how they may accessed and created follows.

In addition to facilitating interaction among addressable end points which map to actual services, the services network of the present invention also facilitates communication between the end points and addressable virtual or composite services or business processes operating within the network. Such business processes (which may comprise multiple, nested processes) are capable of orchestrating the movement of received messages among multiple end point services. One of the advantages of providing business processes which operate in the services network is that such processes may allow a service provider to deploy services to customers without deploying code to the service provider's data center. As will be discussed, other advantages may include shared visibility and independently verifiable audit trails to all participants in a process or data exchange.

Business processes may include any kind of business logic and are operable to make decisions based on the content of a message. For example, a business process may be operable to halt execution at a certain stage of a transaction to invoke some kind of human work flow, e.g., to solicit the approval of a specific individual. In another example, a business process might be configured to initiate a credit check where the amount of an invoice exceeds a specific monetary threshold. The decisions trees executed by such processes may be very simple or extremely complex.

Again, an example of a business process with a moderately complex decision tree may be instructive. A business process may exist in the services network which is capable of connecting to a service provider's catalog, selecting an item in the catalog, and creating an auction for that item on the service provider's behalf. The process may then monitor the auction and, when the auction closes, go to the service provider's inventory system and put the item on hold. The process may then connect to a payment service to effect issuance of a payment request to the auction buyer and, when the payment request is satisfied, connect with the service provider's inventory system to effect shipping of the item to the buyer. It should be understood that this is merely an example and that the nature and capabilities of such business processes which may be employed with various embodiments of the invention are virtually unlimited.

A service provider can create such business processes in the services network in any of a variety of ways using a wide variety of well known tools and techniques. For example, a representative of the service provider can log onto the network and specify the desired functionality of the process (i.e., the behavior of the decision tree) in some sort of development environment which results in the generation of an executable process. Alternatively, the service provider representative can provide an executable business process flow language file (e.g., a BPEL file) which is then executed in the network by a service corresponding to that file format. It should be understood that, according to various embodiments, business processes may be generated in a wide variety of ways. Therefore, the particular manner in which a business process is generated should not limit the scope of the invention.

According to a specific embodiment, the present invention provides a directory which facilitates access to and enables the customization or creation of connectors which facilitate consumption of specific services associated with end points in a service network by a user associated with one of the end points. These connectors employ business processes operating in the network which facilitate the mapping of business policies between the communicating end points. As used herein, the term "business policies" refers to any requirements associated with an end point which go beyond mediation of the technical connectivity issues associated with the facilitation of data transmission between two end points. Examples of business policies include, but are not limited to, contract mediation, security, encryption, authentication, identity, visibility, auditability policies, etc. Other examples include schematic transformation and semantic transformation (e.g., where part numbers in one system are mapped, correlated and transformed into part numbers of another system); the primary difference being that in one type of transformation the structure of the document is being changed, while in the other the underlying data of the document are being changed. An exemplary connector will now be described with reference to FIG. 2.

Figure 2:
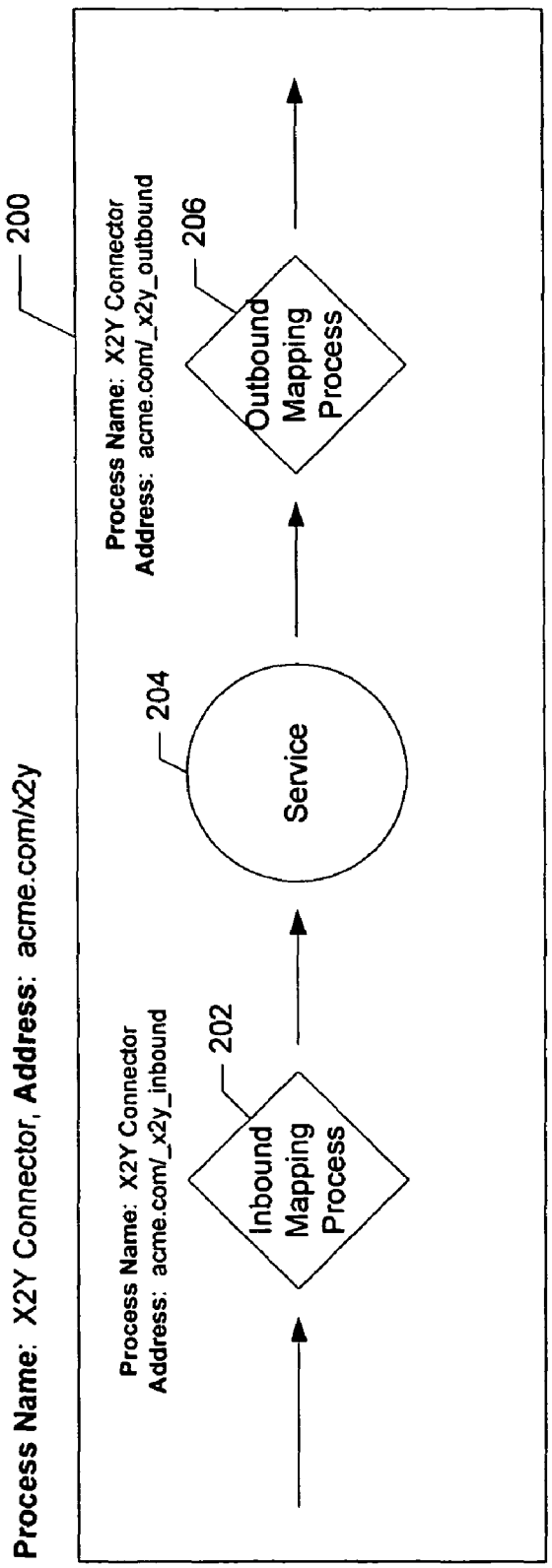
FIG. 2 is a simplified block diagram of a connector according to a specific embodiment of the invention.

According to a specific embodiment of the invention shown in FIG. 2, a connector 200 is an addressable business process (which may be a set of nested business processes) deployed on a hosted services network that is bound to a specific service on the network. Connector 200 serves as a "container" for an inbound mapping process 202, the service 204 to which the connector is bound, and (optionally) an outbound mapping process 206. As shown with respect to inbound process 202, each of the processes or services within connector 200 may comprise a number of processes or services (e.g., $S_A$, $S_B$ and $S_C$) which operate on the input to effect the desired mapping or transformation. The purpose of connector 200 is facilitating the connection of two disparate end point systems, i.e., one being associated with service 204 and the other being associated with the consumer (208) of the service. Each such connector runs in conjunction with the messaging processes within the network which mediate the technical differences between end points.

Inbound mapping process 202 receives a request from service consumer 208, applies some set of transformations which map the request to the format expected by service 204, and sends the transformed request to service 204 which then takes some action in response to the request. If a response is to be returned by service 204 to consumer 208, the response is received by outbound mapping process 206 which applies some set of transformations which map the response to the format expected by consumer 208, and sends the transformed response to the consumer. It should be understood that, while consumer 208 may represent a service associated with an end point as depicted in FIG. 2, it may also represent a service or process operating within the network. It should also be noted that any connector or any of the services or processes used to implement a connector may be newly created services or processes or preexisting services or processes accessed through the directory.

It should also be understood that the services network in which such connectors are deployed may be operable to bill users for the use of the connectors in a variety of ways. For example, an enterprise might be billed each time one of its members sends a message in the network which employs a particular connector. Alternatively, an enterprise might be billed for connector usage on a volumetric or calendar basis.

FIGS. 3 through 8 are screen shots illustrating a process by which a user, e.g., a developer associated with a service provider or enterprise, may discover and enable consumption of a specific service using an enhanced directory according to a specific embodiment of the invention. It should be noted that the depicted directory structure is merely exemplary and that many variations of directory structures may be employed to implement the invention. In the embodiment shown in FIG. 3, the directory (i.e., Public Directory) is organized into a hierarchy of categories of services, selection of one of which (e.g., Some Service Category) links to the page shown in FIG. 3 which lists subcategories within that category (i.e., Additional Categories) as well as a list of Services in the selected category. As will be understood, there may be many levels in such a hierarchy.

Each service listing includes the service name (e.g., htmail—Do It Yourself Email Marketing) along with a description of the service and the provider of the service. Also associated with each service is a list of connectors which tells the user at least some of the supported protocols (e.g., Synchronous SOAP|Asynchronous SOAP|FTP) for consumers of the service.

As a technical matter, any end point connected to the services network can address and send data to any other end point (assuming authorization to do so) without explicit reference to these protocols by virtue of the messaging technique underlying the network. However, as discussed above, without the proper mapping of business policies by an intervening business process on the network, the transfer of data between the end points may end up a meaningless exercise. Thus, even though the network supports connectivity between virtually any protocols, the directory provides explicit information for a subset of currently supported protocols. As will be seen, this information is a starting point for the user to set up consumption of a specific service in a way that ensures the meaningful transfer of information.

Referring back to FIG. 3, selection of a connector link associated with a particular service (e.g., the Asynchronous SOAP link associated with the htmail service) results in presentation of a connector page such as, for example, the one shown in FIG. 4. The connector page provides specific information about the nature of the connector and how to consume the associated service using the connector. The connector page may provide a set of URLs which address the various interfaces which may be employed to communicate with the connector. The page may also provide links to schemas which are relevant to the connector.

The specific example shown in FIG. 4 describes an asynchronous SOAP connector. It will be understood that the information presented will be different depending upon the connector type. For example, for an FTP connector, an FTP URL, user name and password conventions, directory information, and any necessary command for accessing the directory might be provided. Information might also be provided relating to how documents are transformed via the connector.

In some cases, the connector page may also provide links (not shown) to a set of WSDL files which provide the standard interface definition which typically includes some or all of the data types bound to the service, the URL to connect with to consume the service, security bindings, data bindings, protocol bindings, etc. Developers need only introduce such WSDL files into their programming environment to be able to interact with the connector.

Because the architecture of the services network of the present invention is generally open and shareable, previously created connectors may be employed by developers associated with unrelated end points. For example, where a connector for a particular service which supports the protocol used internally by a developer already exists in the network, all the developer needs to do is to select the connector in the interface of FIG. 3, obtain the information regarding how to consume the service with that connector using the resources provided via the interface of FIG. 4, and configure his development environment accordingly. The service may then be consumed by the members of the developer's organization.

In some cases, a connector might exist which is close to what a particular developer needs to consume the corresponding service, but must be modified in some way to actually enable consumption from that developer's end point. In such a case, the developer can select the link "Customize Connector" in the interface of FIG. 4 to make such modifications. The developer is then given access to a development environment in which the existing connector may be cloned and modified to conform to the developer's specifications.

So, for example, in the example described above of the distributor interacting with the CSV catalog of a manufacturer, different distributors may each employ different XML structures. In such a case, a previously created connector which effects an XML to CSV transformation for a first type of XML structure may be easily and efficiently modified to effect the transformation for a second type of XML structure. Thus, the open and shareable nature of the services network coupled with the ease of discovery of services and the manner in which such services may be consumed can be leveraged to save significant developer resources.

This realization of efficiencies from the developer's point of view may be contrasted with, for example, the approach employed in valued added networks (VANs). That is, the VAN provider will typically charge an enterprise full price for each connector it employs regardless of whether similar or even identical connectors have already been created for other customers. So, even though the VAN provider may realize some efficiency, this is not typically passed on to the customer.

Referring back to the service network of the present invention, there are some cases in which the developer will see the service he wants to consume in the directory, but will not see an appropriate connector listed with that service. In such a case and according to a specific embodiment of the invention, the enhanced directory is operable to facilitate a process by which the developer creates a suitable connector.

According to some embodiments, where a connector is created or customized for a particular service, the provider of that service may be notified and given the option of listing that connector in the directory with their service, and/or binding the connector to its service in some way. For example, a developer associated with a particular enterprise might create a new connector to enable consumption of a service by members of his enterprise. In response to publication of the new connector, an e-mail would be generated to a representative of the provider of the service for which the connector was created. Such an e-mail might notify the service provider of the publication of the new connector and provide a link to the new connector so that it can be reviewed. The service provider can then make decisions regarding the visibility and availability of the new connector relative to its service.

Of course it will be understood that, despite the open nature of the services network, there are some circumstances in which newly created or customized connectors may not be made generally available in the directory. For example, a user might create a connector having no particular utility simply as an exercise. Alternatively, a developer might create a connector that he would like only to be used by members of his enterprise and/or its affiliates and partners. As yet another alternative, a service provider may decide that it doesn't want a particular connector to be associated with its service in the directory, or that it would like to favor the display of some connectors over others. In such cases, services network personnel (possibly with input from the developer or the service provider) may exercise editorial control as to whether and where in the directory a newly created or customized connector might appear. Such editorial control ensures that connectors appearing in the directory are of sufficient quality to be useful to other developers.

Figure 5:
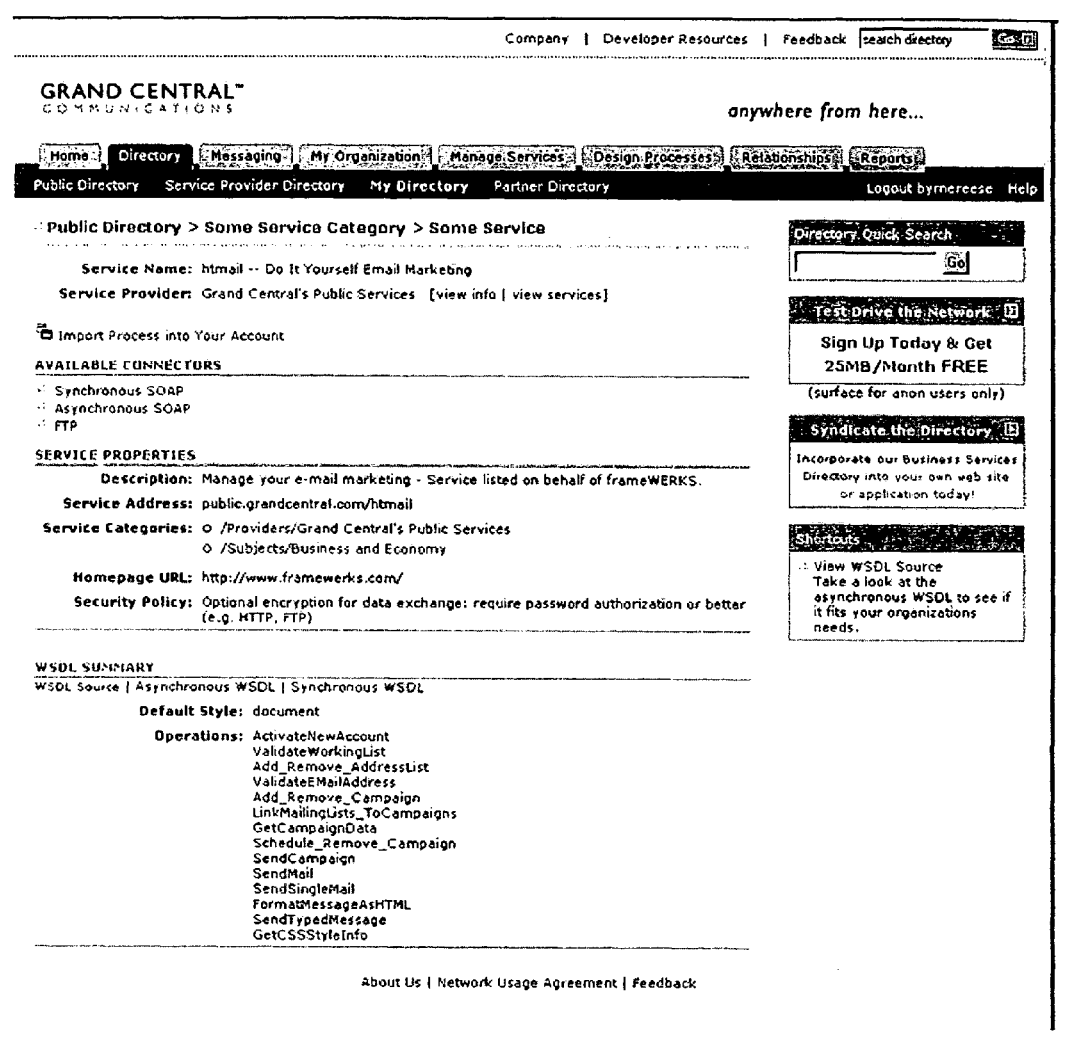

It will also be understood that the set of connectors appearing with a service listing in the directory (e.g., in FIG. 3) may not include all of the connectors actually available in the network for that service. Rather, a more complete list of connectors associated with a particular service may appear in some other part of the directory. For example, by selecting a service name link in the interface of FIG. 3 (e.g., the htmail service), a developer can jump to a summary page for the selected service as shown in FIG. 5. The service provider and/or the creator of a particular connector may exercise editorial control over the visibility of particular connectors in various portions of the services directory.

The exemplary service summary page of FIG. 5 provides a list of Service Properties including, for example, a brief description of the service, the address of the service on the network, the relevant directory categories, the homepage of the service provider, any required security policy, etc. The summary page also provides a list of available connectors for the service which may be more comprehensive than the connectors identified in the linking directory page (e.g., FIG. 3). That is, the list of connectors provided on such a summary page will typically identify all of the publicly visible connectors on the network which have been bound to the service. Selection of one of the connector links (e.g., the Asynchronous SOAP link) results in presentation of the appropriate connector page (e.g., the interface of FIG. 4).

According to various embodiments, a set of visibility rules may be associated with each connector in the network which determine whether and where a user might have access to the connector. For example, there may be a set of connectors which are only useful to users associated with a particular enterprise. It would, therefore, not be particularly useful to expose any of those connectors to anyone outside of that organization. Thus, the visibility rules associated with those connectors would result in a different set of connectors on the service summary page for users from the enterprise than those presented to members of the public or other enterprises. Alternatively, and as mentioned above, the provider of a service may exercise editorial control over the visibility rules for any of a variety of purposes. In another example, a service provider may make a connector available for free for an introductory evaluation period (e.g., 30 days), but then automatically restrict access to the connector after the evaluation period until payment is received or some contractual arrangement is made. As will be understood, these are just specific examples of the myriad ways in which the services network may manage access to services on the network. That is, the directory views and access to specific connectors may be controlled to varying levels of granularity (i.e., based on identity, group membership, role, etc.) using the directory capabilities of the services network.

At various points in the services directory or on a service summary page, an "(+) Add Connector" link may be provided by which a developer can begin the process of creating a new connector. This would not typically be available to someone browsing the public directory, but rather to a registered user on the network who would typically be presented with a more individualized or personal version of the directory. An example of such a personalized view is the "My Services" page of FIG. 6.

Figure 6:
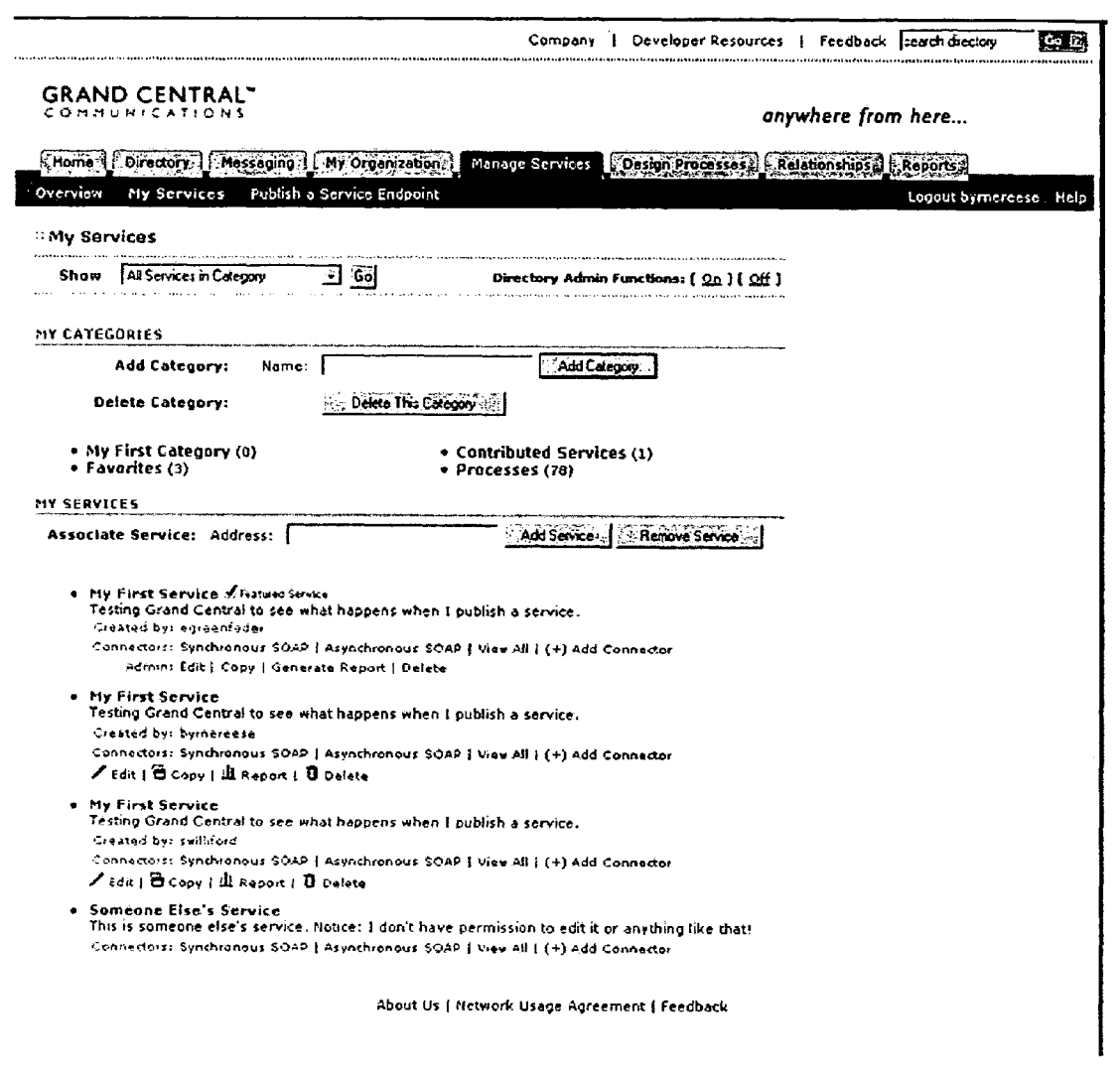

As shown in FIG. 6, various functionalities are provided to the registered user by which further customization of the personal directory may be effected. For example, the user can add or delete categories of services, and create or add services to categories. As with the public view of FIG. 3, the personalized directory view may include a list of services, each listing of which includes at least some of the supported connectors associated with that service. As with the interface of FIG. 3, by selection of the service name link, the user can access the service summary page (e.g., FIG. 5). In contrast with the interface of FIG. 3, the user is also given the option of creating a new connector by selection of the (+) Add Connector link associated with each service.

Selection of the (+) Add Connector link results in presentation of the "Create Connector: Step 1" page of FIG. 7 which begins the process by which a developer can create new inbound and outbound mapping processes and binding them to a service. The developer provides a name for the connector in the Connector Name field. This is the name which will show up in the services directory. The developer also specifies an address to which messages directed to the connector are sent (in the Address field).

The developer can also specify whether others will be allowed to copy the connector using the box associated with the text "Allow others to copy this connector." Selection of this box turns off the "Customize Connector" link on the connector page (e.g., FIG. 4). According to various embodiments, the Create Connector: Step 1 page may include a variety of functionalities by which the developer can define visibility and/or copying privileges for the connector at varying levels of granularity within the context of the services network (e.g., defining which individuals associated with which organizations can either see and/or copy the connector).

The developer also specifies the type of connector by making the appropriate selection in the Connector Type portion of the page. That is, for example, the developer specifies whether the connector follows a request-response messaging paradigm, permits only one-way notifications (e.g., request only), or supports both one and two-way messaging.

In the Create Connector: Step 1 page, the developer can also specify the communication protocol bindings for the connector being created in the Post Interface Binding portion of the page. This selection determines what processes and interface will be employed within the network to mediate the technology differences between the service associated with the connector and consumers of the service using the connector to consume the service. It will be understood that the interface list shown (representing HTTP and FTP interfaces) is merely exemplary and that any of a variety of interface types may be supported and employed to create a connector.

That is, using the "Custom" option in the Post Interface Binding list, the developer can specify the address of a post interface or adapter which is operable to mediate communications using any kind of protocol set, whether standard or proprietary. The address (or URL in this case), which indicates where requests are to be posted in order to communicate with the service network, may be located on the developer's server, hosted by the services network, or hosted by a third party.

Figure 8:
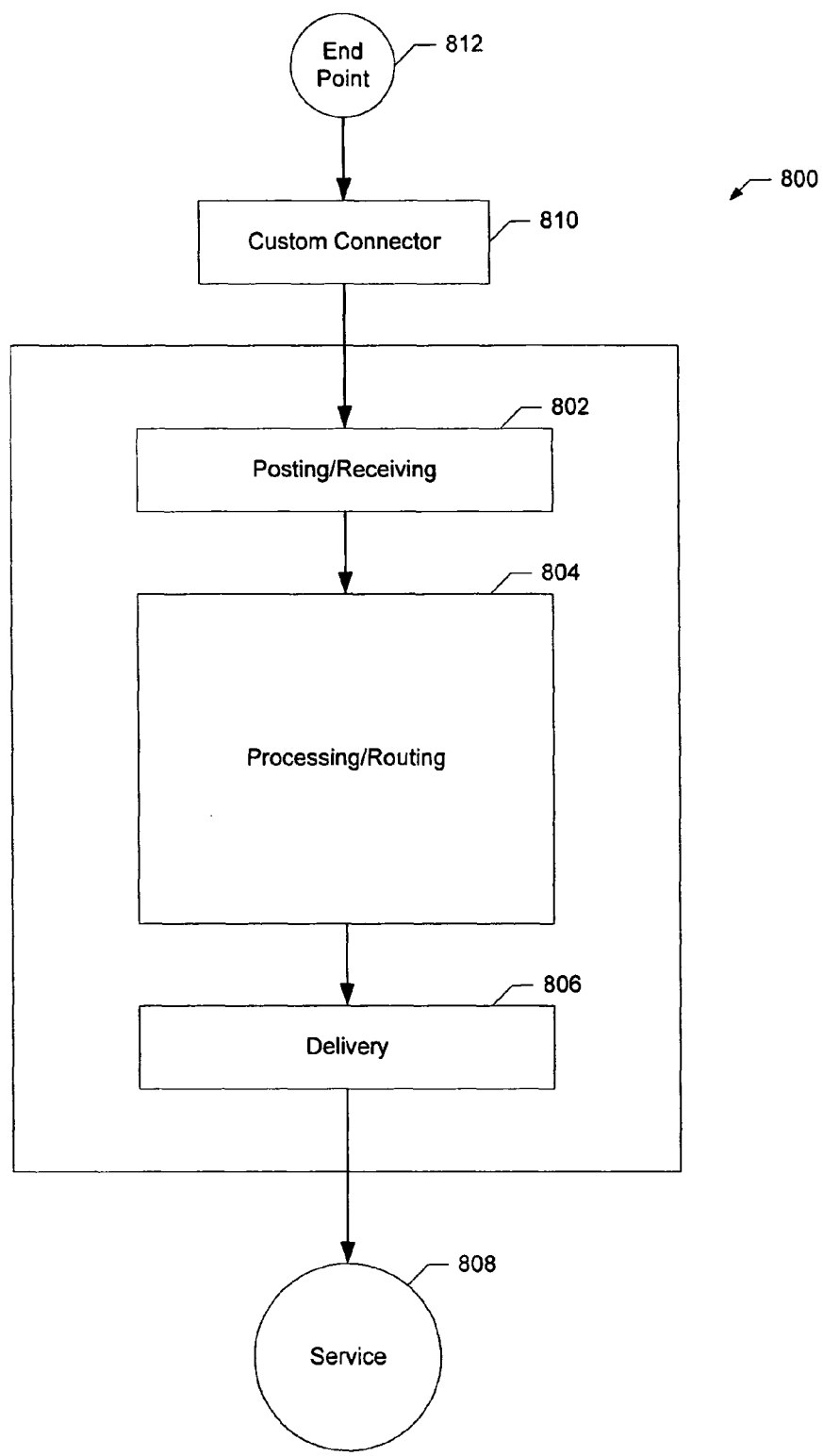
FIG. 8 is a simplified block diagram of a portion of a service network according to embodiments of the invention.

An example of how such an adapter relates to communications between a requester and a service will be described with reference to the block diagram of FIG. 8. In general, message processing in services network 800 may be conceptualized as having three "layers." A posting layer 802 which is operable to receives messages corresponding to a particular protocol set, a processing/routing layer 804 which operates on messages and routes them to the appropriate end points, and a delivery layer 806 which communicates with a particular end point, e.g., service 808, using the protocol set appropriate for that end point. Service 808 can then respond via either of the posting and delivery layers.

According to a specific embodiment, a custom connector 810 is inserted in the messaging process in between posting layer 802 and the end point 812 requiring communication with the network using the custom connector. Custom connector 810 (which may reside on a server associated with end point 812, but may be in network 800 or some intermediate, third-party location) is a process which acts as a proxy to network 800. End point 812 posts messages to connector 810 which performs a mapping from the protocol set associated with the end point to one of the supported posting interfaces on network 800 (i.e., in posting layer 802). Similarly, responses received from the network are mapped by connector 810 to the locally required protocol set.

Figure 7:
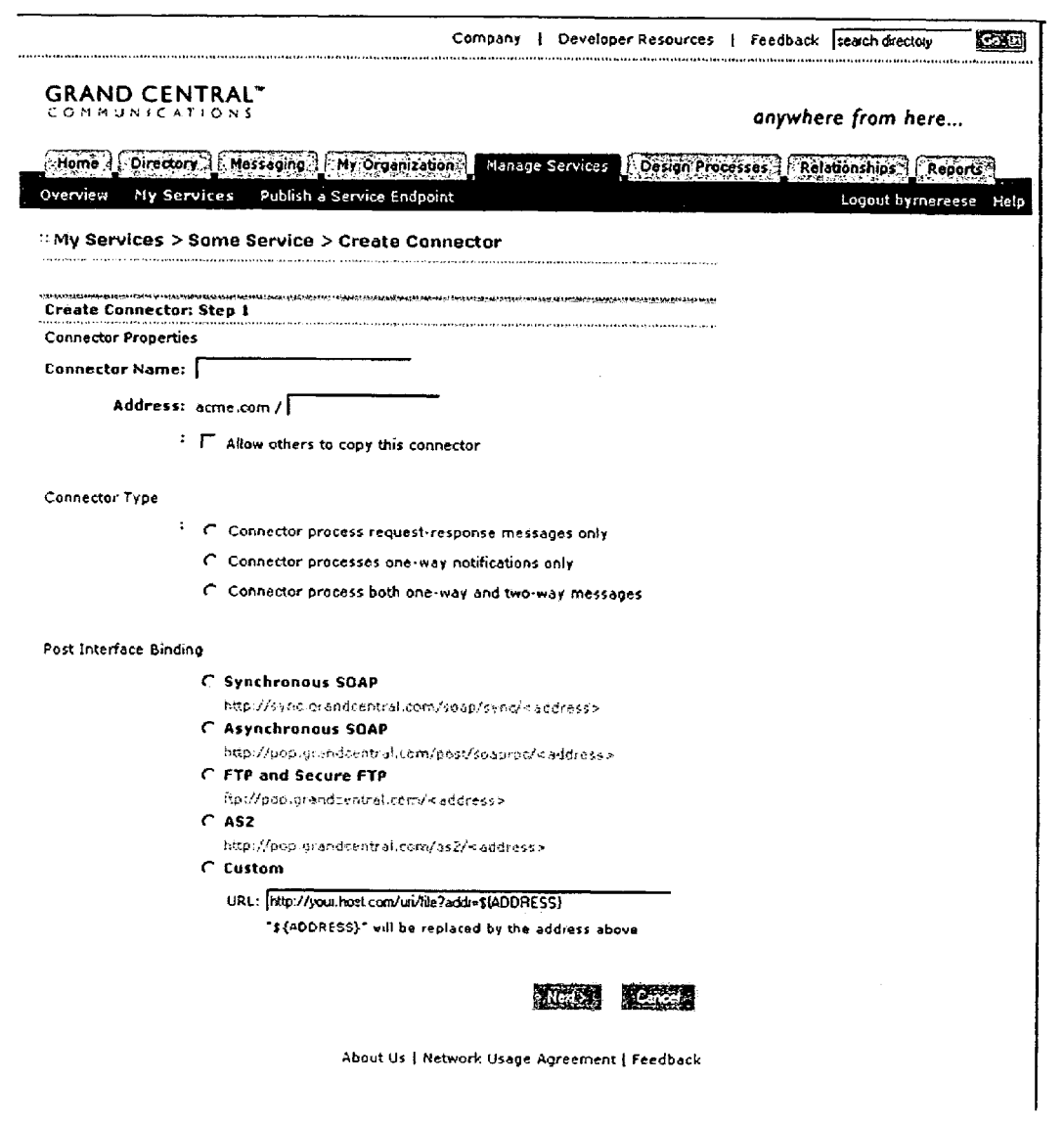

The interface of FIG. 7 may also include a text box (not shown) in which a developer creating a custom connector can provide documentation regarding any necessary specifics to facilitate using the custom connector, e.g., authentication instructions, code samples.

Figure 9:
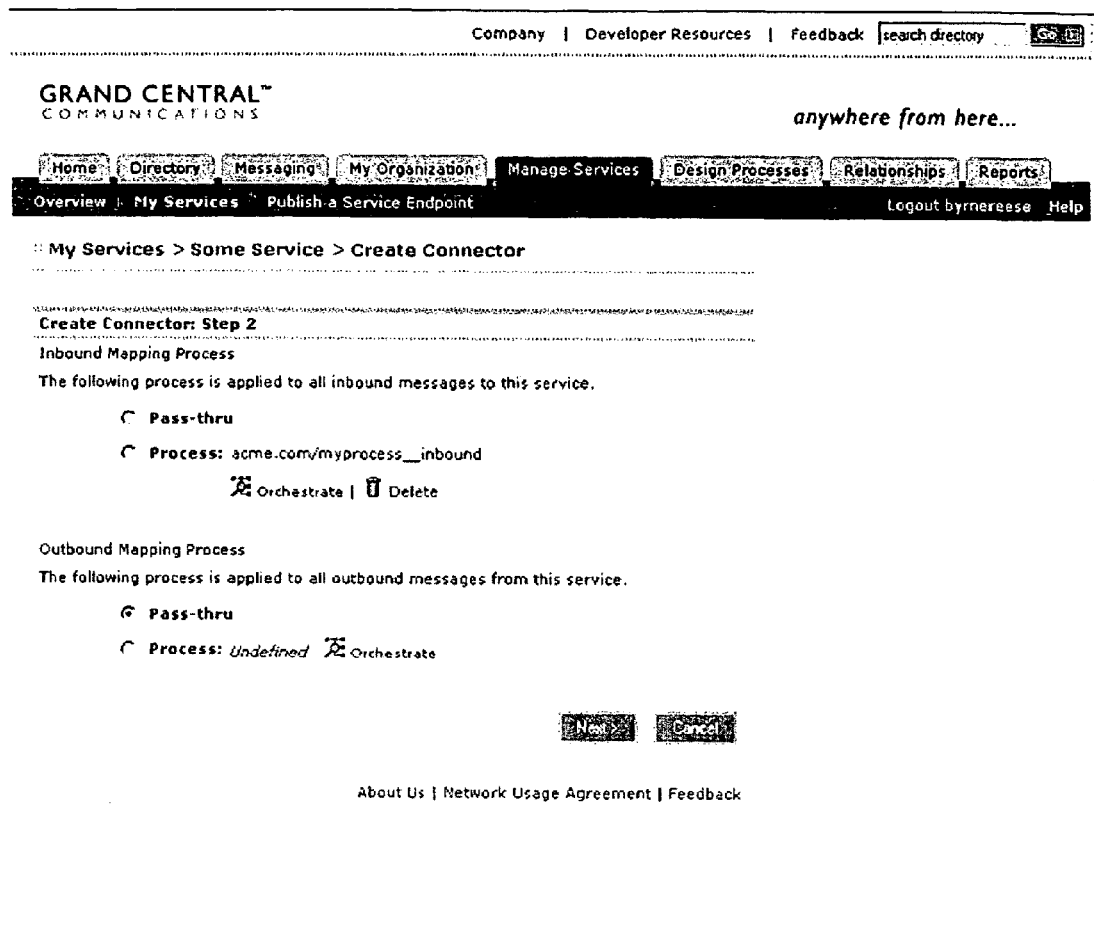

The interface of FIG. 9 illustrates the next step of connector creation in an exemplary "Create Connector: Step 2" page. From this page, the developer can launch a development environment (e.g., by selection of the Process option and the associated "Orchestrate" links) in which the inbound and outbound mapping processes associated with the connector (e.g., processes 202 and 206 of FIG. 2) can be created. An exemplary development environment is shown in FIG. 10.

Notice that the developer has the option of not creating either type of process by selecting the Pass-thru option. This might be useful, for example, where the end points don't have the business process mediation issues described above. It should be noted that where the developer is creating a one-way notification connector, only an inbound mapping process may be created. It should also be noted that the nature of the development or design environment used by the developer to create the mapping processes can vary considerably without departing from the scope of the invention.

Figure 10:
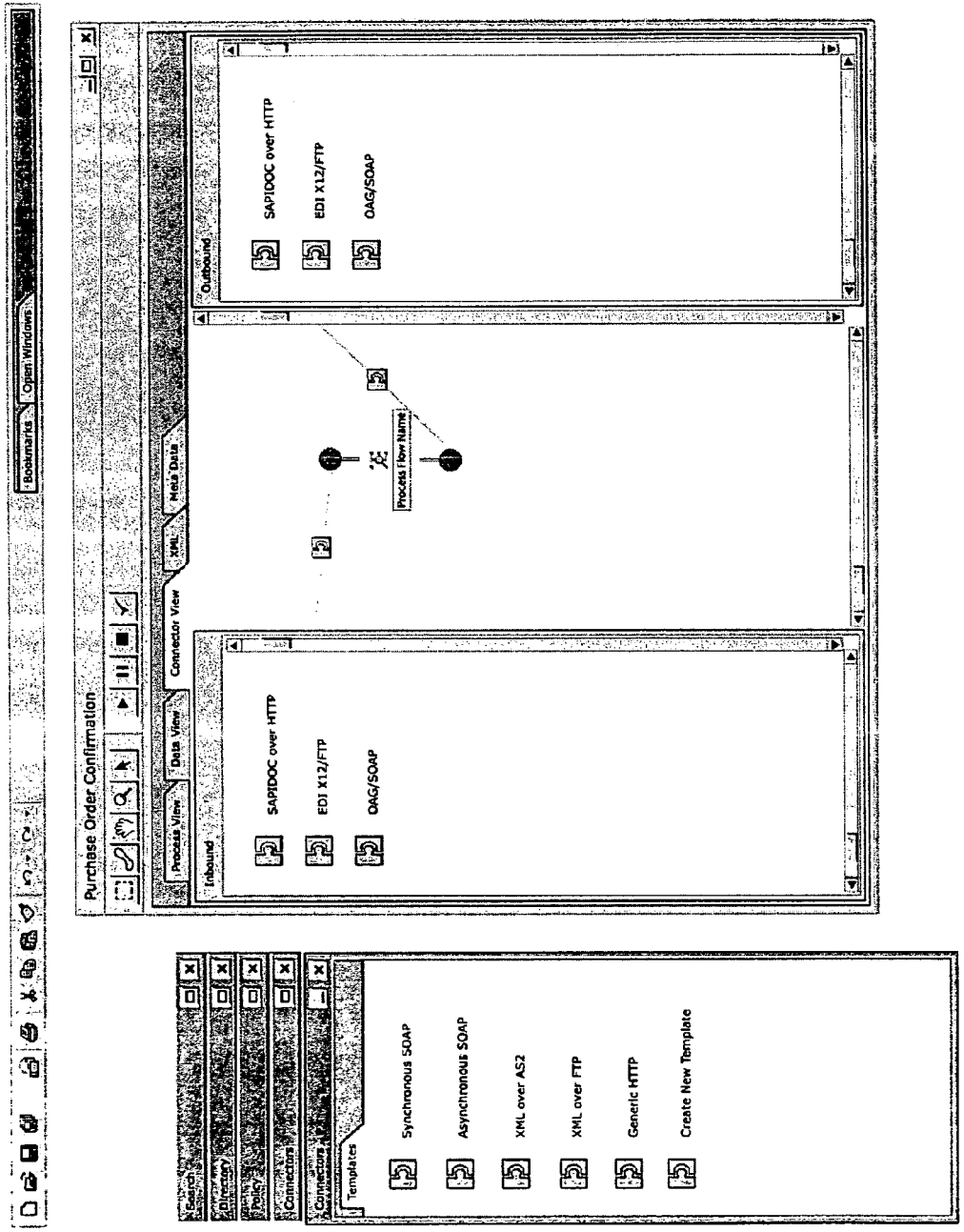

According to a specific embodiment, and as shown in FIG. 10, the network may provide connector templates from which new connectors may be constructed. The appropriate template may be automatically presented to the developer in the connector development environment based on the connector type and protocol specified by the developer. For example, as discussed above with reference to the exemplary interface of FIG. 7, the developer identifies the connector type and the post interface bindings. Using the stored information about the protocol employed by the service for which the connector is intended, the network can select from among a plurality of templates or primitives which facilitate mediation of the underlying technical connectivity issues necessary to achieve data transfer between the two end points. The developer is then presented with the template or primitive on top of which the necessary inbound and/or outbound mapping processes may be constructed.

In contrast to ad hoc solutions provided by traditional integration software providers, the services network of the present invention hosts, executes, monitors, and provides visibility into the processes which enable communication and consumption of services between a wide variety of heterogeneous end points. In addition, the open, shared context in which at least some of these processes operate not only provides visibility to users with respect to the services they are consuming, but also allows them to easily extend and customize previous solutions created by others.

Figure 11:
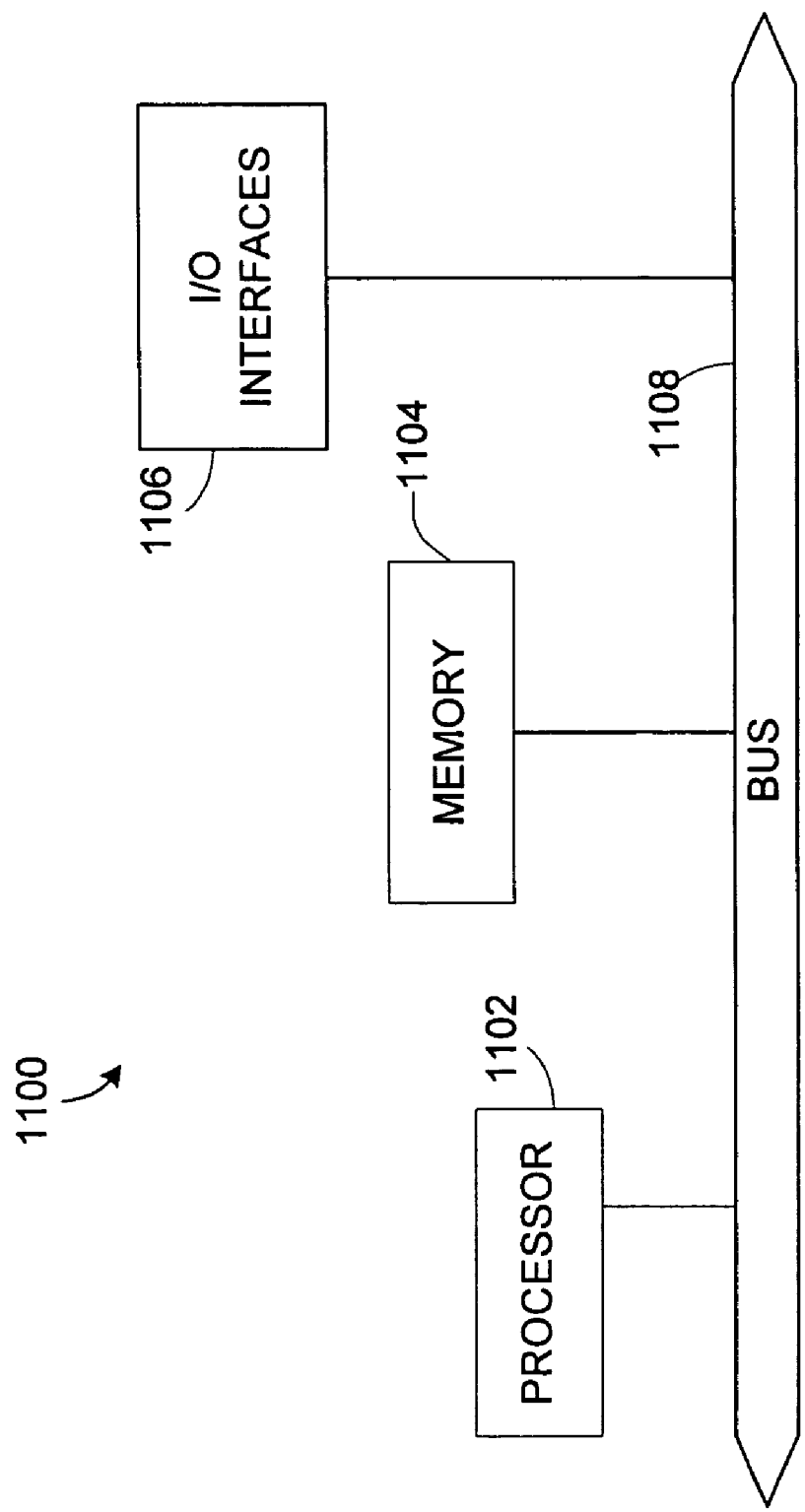
FIG. 11 is a block diagram of a computer system suitable for implementing various aspects of the present invention.

Referring now to FIG. 11, a computer system 1100 suitable for implementing various aspects of the present invention (e.g., server 707 of FIG. 7) includes one or more central processing units (CPUs) 1102, one or more blocks of memory 1104, input and output interfaces 1106, and a bus 1108 (e.g., a PCI bus). Alternatively, computer systems employing point-to-point infrastructures instead of buses may also be employed. When acting under the control of appropriate software or firmware, CPU 1102 is responsible for implementing various portions of the techniques of the present invention. It preferably accomplishes all these functions under the control of software including an operating system and any appropriate applications software. CPU 1102 may include one or more processors. In a specific embodiment, some portion of memory 1104 (such as non-volatile RAM and/or ROM) also forms part of CPU 1102. However, there are many different ways in which memory could be coupled to the system. Memory block 1104 may be used for a variety of purposes such as, for example, caching and/or storing data, program code, etc.

The input and output interfaces 1106 typically provide an interface to various I/O devices, such as mouse, keyboard, display, as well as providing an communication interface with other computer systems over a computer network. Among the communication interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

It will be understood that the system shown in FIG. 11 is an exemplary computer system and is by no means the only system architecture on which the various aspects of the present invention can be implemented.

Regardless of system's configuration, it may employ one or more memories or memory modules (such as, for example, memory block 1104) configured to store data, program instructions for the general-purpose network operations and/or the inventive techniques described herein. The program instructions may control the operation of an operating system and/or one or more applications, for example. The memory or memories may also be configured to store information in a repository directory.

Because such information and program instructions may be employed to implement the systems/methods described herein, the present invention also relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

The following examples illustrate some common (although not exhaustive) connector usage scenarios. Examples of connector operation are also provided. It should be understand that these descriptions are merely exemplary and should therefore not be used to limit the scope of the invention.

In a first example, a developer finds the service they wish to consume, and they find a connector entitled "SOAP" associated with that service. Because they utilize a Microsoft .NET framework the developer clicks on the "SOAP" connector. On the connector details page they find the following resources. They are provided a Synchronous WSDL and an Asynchronous WSDL which have certified against the .NET platform (all supported platforms actually). These WSDLs provide the necessary data and protocol bindings to consume the service over the network.

They are also presented with all permissible authentication options and how authentication credentials can be generated for each (HTTP Authorization Header, WS-Security, SAML, etc). They are then asked to select the platform and/or toolkit with which they wish to utilize to consume the service. Once selected, sample client code is presented to the developer which they may use immediately in their environment.

The user is also presented with discreet schema definitions for common messaging elements (post header, delivery header, alerts, etc). Detailed instructions on how to use the resources are also presented. Finally, references to common resources commonly used by developers (e.g., the SOAP specification, links to favorite Web service development web sites, etc.).

In another example, a developer finds the service they wish to consume, and they find a connector entitled "FTP" associated with that service. Because the developer's company used FTP frequently for data exchange between partners the developer clicks on the "FTP" connector. On the connector details page they find the following resources. They are provided with the URL of the FTP server to which they should connect, as well as authentication instructions for the FTP server. They are provided with instructions on how to connect to the FTP server over SSL, also known as "Secure FTP." They are also provided with a list of supported FTP clients and how to download them, as well as with screenshots of one sample FTP client to illustrate how it is configured.

Schemas for the files that will be delivered to the associated service are also provided. This would be useful when the service being connected to is a SOAP service, for which a WSDL has been provided. Individual schema files could be generated for each file that needs to be posted to the service. The connector would then implicitly know how to transform the posted file into a properly formatted SOAP envelope.

Some examples of connector operation will now be provided.

The "native connector" is perhaps one of the most obvious connectors that should exist for a service. A native connector is the connector utilized when the consumer and the producer are configured such that no transformation or mediation is necessary in order for the two parties to exchange data and interoperate. According to one implementation, every service in the directory provisions at least one connector, i.e., its native connector. For example, when a user publishes a SOAP service to the directory, then technically, any SOAP client should immediately be able to send messages to it. The same is true for an AS2 service that is published to the directory, i.e., by default any AS2 client should be able to message with the service immediately. From a user's perspective, the services network appears to be no more than a proxy when invoking the service's native connector.

According to some implementations, the services network is operable to automatically generate a SOAP connector for any service on the network provided that the proper schema files have been provided by the service provider/developer. For example, an FTP service may be published to the network. An FTP connector is provisioned automatically, and if the service provider uploaded a schema for the file format of the file that will be delivered via the FTP connector, then a SOAP connector and WSDL file is inferred from the schema by the network and provided to the service provider's customers.

In the examples mentioned above, it is not necessary that a connector actually be physically created. However, according to a particular embodiment, a connector is still presented to the user in the directory for the purpose of establishing a convention and pattern for learning how to consume services in the directory. One scenario for the automatic creation/registration of a native connector will now be described.

A user logs into the service network with the intent of registering a new service within their organization so that their customers can begin sending messages to it. After logging in, the user immediately goes to the "Manage Services" page. The user then enters a "Publish an Endpoint" wizard. They elect to publish a SOAP service. The user is required to enter a WSDL for the service. They provide the network with all the other necessary information throughout the course of the publish wizard.

At the end of the wizard, the following changes can be observed. The new service can be found listed among the service provider's other services in the Service Provider Directory (assuming of course the proper visibility permissions have been set). The new service will have one connector listed among its supported connectors entitled: "SOAP." The new service's SOAP Connector detail page will contain instructions for consuming that service both synchronously and asynchronously over the services network.

Some more detailed example which delve a little deeper into connector operation follow.

In a first example, a SOAP Connector to an SAP System (release 4.6 or earlier) is described. SAP systems less than and equal to version 4.6 utilize EDI document formats (BAPI) and XML document formats (IDOC) when exchanging data. The HTTP transport protocol is used for both document formats. Thus, a SOAP connector to an SAP system that processes BAPI documents will need to have an inbound mapping process which transforms the SOAP Document into a positional flat file format, and renames message parts and transform the internal message format so that it conforms to the conventions for the BAPI/SAP delivery agent. The SOAP connector will also need to have an outbound mapping process which transforms the input received by the Generic HTTP posting/delivery interface from a positional flat file into a generic XML file format, and uses XSLT to transform the generic XML generated in the previous step into SOAP.

According to a specific embodiment, a delivery agent is a component of the services network that defines specifically how a service or endpoint on the network wishes to receive data. An example of such a delivery agent is a SOAP agent which instructs the network to deliver messages based upon the conventions outlined by the SOAP standard. A service provider could, however, write a custom delivery agent with which the specific protocol is defined by a developer in the form of a script (e.g. JavaScript).

Modern SAP systems (release 4.7 or later) utilize SOAP over HTTP as their primary protocol. As a result, a SOAP connector may not need to be created because the service's native SOAP connector should do the trick. However, just because a service speaks SOAP natively, does not completely obviate the need for additional SOAP connectors for that service. In one scenario, Acme, Inc. would like to use the services network of the present invention to ease the migration from a Seibel CRM system to Salesforce. The customer currently uses Seibel's SOAP interfaces throughout their internal systems and applications. They would like to migrate over to Salesforce's system. The customers just went through a lengthy integration project and cannot afford to retool all of their internal systems to use Salesforce's APIs in lieu of Seibel's.

The services network of the present invention presents a solution to this problem, i.e., a "Seibel SOAP to Salesforce SOAP Connector." This connector accepts messages conformant to Seibel's WSDL definitions and transforms them into SOAP messages compatible with Salesforce's WSDL definitions. This enables Acme Inc. to begin using Salesforce without the need to significantly retool their applications. Virtually all that would be required would be to change the URLs to which the application posts messages.

An FTP to SOAP connector would be bound to the FTP Post interface and would facilitate the delivery of messages to a SOAP endpoint. According to one embodiment, the FTP post interface accepts incoming files and attaches them to an empty SOAP message as follows:

```
Content-type: multipart/related, boundary=AaB03x
--AaB03x
Content-type: text/xml;
<?xml version="1.0"?>
<soap:Envelope
xmlns:soap="http://schemas.xmlsoap.org/soap/envelope/"
         xmlns:xsd="http://www.w3.org/2001/XMLSchema"
         xmlns:xsi="http://www.w3.org/2001/XMLSchema-
instance">
    <soap:Body />
</soap:Envelope>
--AaB03x
Content-disposition: attachment; filename="file1.xml"
Content-Type: text/xml
<PurchaseOrder xmlns="urn:acme.com/po">
    <partNumber>1234567890</partNumber>
    <costPerUnit>$99.99</costPerUnit>
    ...
</PurchaseOrder>
--AaB03x--
```

This is the format of the message as it is delivered to the FTP to SOAP connector process.

To facilitate the integration process, the following mapping processes are defined. An inbound mapping process uses XSLT to transform the posted XML into a SOAP message compliant with the recipient service's WSDL. Given the message above for example, the inbound mapping process may produce a message that looks like the following:

```
<?xml version="1.0"?>
<soap:Envelope
xmlns:soap="http://schemas.xmlsoap.org/soap/envelope/"
         xmlns:xsd="http://www.w3.org/2001/XMLSchema"
         xmlns:xsi="http://www.w3.org/2001/XMLSchema-
instance">
    <soap:Body >
      <foo:submitPO xmlns:foo="http://some.uri/submitpo">
         <po>
            <partNumber>1234567890</partNumber>
            <quantity>10</quantity>
            <costPerUnit>$99.99</costPerUnit>
            ...
         </po>
      </foo:submitPO>
    </soap:Body>
</soap:Envelope>
```

Because FTP does not inherently support bi-directional data exchange in the form of request-response, an outbound mapping process is not typically necessary. It is conceivable however that an outbound process could be created that could take the SOAP response returned by the Web service being connected to, and post it as a file to a designated directory on an FTP server at the sender's company. Or, the outbound connector could return the response in the form of an e-mail to the organization's administrator.

In another example, eBay currently utilizes a proprietary XML API over HTTP. Thus, a SOAP connector to this interface is provided which accepts a SOAP message and transforms it into a request that looks like this:

```
POST / HTTP/1.1
User-Agent: Mozilla/4.0 (compatible; MSIE 5.01; Windows NT)
Host: api.ebay.com
X-EBAY-METHODNAME: ValidateUserRegistration
```

-continued

```
X-EBAY-APPID: <hex ID>
X-EBAY-DEBUG: 305
X-EBAY-DEVID: <hex ID>
X-EBAY-CERTID: <hex ID>
Connection: Keep-Alive
<?xml version='1.0' encoding='iso-8859-1'?>
<request>
    <RequestUserId>testID4</RequestUserId>
    <RequestPassword>ult3cat</RequestPassword>
    <Verb>GetSellerTransactions</Verb>
    <DetailLevel>2</DetailLevel>
    <ErrorLevel>1</ErrorLevel>
    <SiteId>0</SiteId>
    <LastModifiedFrom>2001-10-01 19:06:22</LastModifiedFrom>
    <LastModifiedTo>2001-10-10 19:06:22</LastModifiedTo>
    <TransactionsPerPage>10</TransactionsPerPage>
    <PageNumber>1</PageNumber>
</request>
```

Because some parameters to eBay are passed via the HTTP transport layer, the SOAP request message accommodates these parameters. Therefore the posted SOAP message looks something like this:

```
<?xml version="1.0"?>
<soap:Envelope xmlns:soap="http://schemas.xmlsoap.org/soap/envelope/"
        xmlns:xsd="http://www.w3.org/2001/XMLSchema"
        xmlns:
        xsi="http://www.w3.org/2001/XMLSchema-instance">
    <soap:Body>
        <validateUserRegistration xmlns="http://ebay.grandcentral.com">
            <devId>...</devId>
            <appId>...</appId>
            <certId>...</certId>
            <RequestUserId>testID4</RequestUserId>
            <RequestPassword>ult3cat</RequestPassword>
            <Verb>GetSellerTransactions</Verb>
            <DetailLevel>2</DetailLevel>
            <ErrorLevel>1</ErrorLevel>
            <SiteId>0</SiteId>
            <LastModifiedFrom>2001-10-01
19:06:22</LastModifiedFrom>
            <LastModifiedTo>2001-10-10 19:06:22</LastModifiedTo>
            <TransactionsPerPage>10</TransactionsPerPage>
            <PageNumber>1</PageNumber>
        </validateUserRegistration>
    </soap:Body>
</soap:Envelope>
```

The outbound mapping process for this connector performs the same series of transformations, but in reverse.

In the example above, the described connector accepts a SOAP message and posts it to an eBay system utilizing a generic HTTP posting service. However, there could just as easily be the need to support the reverse. For example, imagine that eBay stopped supporting their XML API in favor of a SOAP API. Existing eBay customers would be forced to migrate to the new API and technology which may prove costly or problematic for them. In such a situation, the services network of the present invention provides a connector to which users of eBay's XML API can post messages which the connector maps to eBay's SOAP API. According to one implementation, the services network supports a new posting interface, i.e., a generic HTTP posting interface.

The generic HTTP posting interface can accept any data sent over HTTP. A sample eBay request that looks like this:

```
POST / HTTP/1.1
User-Agent: Mozilla/4.0 (compatible; MSIE 5.01; Windows NT)
Host: api.ebay.com
X-EBAY-METHODNAME: ValidateUserRegistration
X-EBAY-APPID: <hex ID>
X-EBAY-DEBUG: 305
X-EBAY-DEVID: <hex ID>
X-EBAY-CERTID: <hex ID>
Connection: Keep-Alive
Content-type: text/xml
<?xml version='1.0' encoding='iso-8859-1'?>
<request>
    <RequestUserId>testID4</RequestUserId>
    <RequestPassword>ult3cat</RequestPassword>
    <Verb>GetSellerTransactions</Verb>
    <DetailLevel>2</DetailLevel>
    <ErrorLevel>1</ErrorLevel>
    <SiteId>0</SiteId>
    <LastModifiedFrom>2001-10-01 19:06:22</LastModifiedFrom>
    <LastModifiedTo>2001-10-10 19:06:22</LastModifiedTo>
    <TransactionsPerPage>10</TransactionsPerPage>
    <PageNumber>1</PageNumber>
</request>
```

Could get serialized into a SOAP message that looks something like this:

```
<?xml version="1.0"?>
<soap:Envelope
xmlns:soap="http://schemas.xmlsoap.org/soap/envelope/"
        xmlns:xsd="http://www.w3.org/2001/XMLSchema"
        xmlns:xsi="http://www.w3.org/2001/XMLSchema-
instance">
    <soap:Header>
        <gc:httpHeaderData>
            <header>
                <name>User-Agent</name>
                <value>Mozilla/4.0 (compatible; MSIE 5.01; Windows
NT)</value>
            </header>
            <header>
                <name>Host</name>
                <value>pop.grandcentral.com</value>
            </header>
            <header>
                <name>X-EBAY-METHODNAME</name>
                <value>...</value>
            </header>
            <header>
                <name> X-EBAY-DEVID</name>
                <value>...</value>
            </header>
            <header>
                <name> X-EBAY-APPID</name>
                <value>...</value>
            </header>
            <header>
                <name> X-EBAY-CERTID</name>
                <value>...</value>
            </header>
            ...
        </gc:httpHeaderData>
    </soap:Header>
    <soap:Body >
        <request>
            <RequestUserId>testID4</RequestUserId>
            <RequestPassword>ult3cat</RequestPassword>
            <Verb>GetSellerTransactions</Verb>
            <DetailLevel>2</DetailLevel>
            <ErrorLevel>1</ErrorLevel>
            <SiteId>0</SiteId>
            <LastModifiedFrom>2001-10-01 19:06:22</LastModifiedFrom>
            <LastModifiedTo>2001-10-10 19:06:22</LastModifiedTo>
            <TransactionsPerPage>10</TransactionsPerPage>
```

-continued

```
        <PageNumber>1</PageNumber>
    </request>
  </soap:Body>
</soap:Envelope>
```

Once serialized into this format, all the necessary data have been collected for the connector to perform the necessary transformations to eBay's SOAP API.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A services network for providing access to a plurality of services by a plurality of users in communication with the services network and having associated client machines, each of the plurality of users being associated with one of a plurality of independent enterprises and including consumers of the plurality of the services, the plurality of services being controlled by a plurality of independent service providers and employing a plurality of interfaces at least some of which are not directly interoperable, the system comprising:

at least one data store having a first directory stored therein which maps an identity corresponding to each of the users to a policy framework which defines access policies relating to the services, the identity for each user identifying the associated enterprise, the at least one data store also having a second directory stored therein which identifies the plurality of services and at least one connector for facilitating consumption of each of the services via the network by consumers associated with a corresponding one of the enterprises, each connector being operable to mediate communication protocol and business policy differences between a first end point on the network associated with the corresponding service and one or more different end points on the network associated with the corresponding enterprise, wherein at least some of the services have two or more different connectors configured to facilitate consumption of the services by consumers associated with different ones of the enterprises, the different connectors reflecting the different communication protocols and business policies of the different ones of the enterprises; and at least one computing device which is operable to connect with each of the client machines and each of the interfaces associated with the services, and to selectively facilitate consumption of the services by the consumers associated with the plurality of independent enterprises with reference to the directory and the policy framework, thereby enabling the consumers associated with different ones of the enterprises to independently access the plurality of services using the services network, the at least one computing device further being operable to provide access to the second directory and, for each of selected ones of the connectors, provide information accessible via the second directory regarding how to use the connector to consume the corresponding service, the selected ones of the connectors including a first connector that includes a first communication protocol by which one or more of the consumers associated with a particular one of the enterprises may communicate with the first connector, the first connector being operable to translate communications between the first communication protocol and a second communication protocol associated with the service corresponding to the first connector.

2. The service network of claim 1 wherein the at least one computing device is further operable to, for each of selected ones of the services, provide access to a connector design process via the second directory, the connector design process being operable to facilitate creation of a new connector for the corresponding service, and to specify at least one business process for mediating the business policy differences.

3. The service network of claim 2 wherein the at least one computing device is further operable to provide at least one connector template from which the new connector may be created.

4. The services network of claim 2 wherein the new connector is not a SOAP connector, the at least one computing device further being operable to automatically generate a SOAP connector with reference to at least one schema file relating to the service corresponding to the new connector.

5. The services network of claim 1 wherein the at least one computing device is further operable to control visibility of each of the connectors in the second directory according to the identities and the policy framework.

6. The services network of claim 1 wherein the at least one computing device is further operable to facilitate copying and customization of one of the connectors.

7. The services network of claim 1 wherein each connector comprises at least one of an inbound mapping process and an outbound mapping process for mediating the business policy differences.

8. The services network of claim 7 wherein the at least one of the inbound mapping process and the outbound mapping process are stored in the at least one data store.

9. The services network of claim 7 wherein the at least one of the inbound mapping process and the outbound mapping process is stored in an enterprise network associated with the corresponding service.

10. The service network of claim 1 wherein the at least one computing device is further operable to provide connector templates from which new connectors may be constructed.

11. The service network of claim 1, the system comprising at least one connector publishing process which is operable to communicate with the data store, the connector publishing process allowing one or more connectors to be published to the services directory such that the one or more connectors may be selected for use by one or more of a plurality of users of the services network.

12. A computer-implemented method for enabling consumption of services via a services network, the method comprising:

providing access to a services directory by a plurality of users in communication with the services network using at least one computer having memory and at least one processor, the plurality of users being associated with a plurality of independent enterprises and including consumers of a plurality of services identified in the services directory, the services directory also identifying one or more connectors for each of the services, each connector being operable to facilitate consumption of the corresponding service via the network by consumers associated with a corresponding one of the enterprises, each connector being operable to mediate communication protocol and business policy differences between a first end point on the network associated with the corresponding service and one or more end points on the network associated with the corresponding enterprise, wherein at least some of the services have two or more different connectors configured to facilitate consumption of the services by consumers associated with different ones of the enterprises, the different connectors reflecting the different communication protocols and business policies of the different ones of the enterprises;

for each of selected ones of the connectors, providing information accessible via the services directory regarding how to use the connector to consume the corresponding service; and for each of selected ones of the services, providing access to a connector design process by selected ones of the users via the services directory, the connector design process being represented by a graphical user interface operable to facilitate creation of a new connector configured to facilitate consumption of a corresponding one of the services by consumers associated with the enterprises corresponding to the selected users, to specify at least one business process for mediating the business policy differences for the enterprises corresponding to the selected users, and to specify a first communication protocol by which one or more consumers associated with the enterprises corresponding to the selected users may communicate with the new connector, the new connector being operable to translate communications between the first communication protocol and a second communication protocol associated with the corresponding service.

13. The method of claim 12 further comprising controlling visibility of each of the connectors in the services directory according to an identity associated with each user on the services network.

14. The method of claim 13 wherein each identity includes any of an enterprise associated with the user, a role within the enterprise associated with the user, and an identifier of a client machine associated with the user.

15. The method of claim 13 wherein controlling visibility of the connectors is also done with reference to a policy framework associated with the network, the policy framework defining access policies relating to the plurality of services.

16. The method of claim 15 further comprising configuring the policy framework for a particular one of the services in response to input received from a service provider representative associated with the particular service.

17. The method of claim 15 further comprising configuring the policy framework for a user in response to input received from an authorized representative of an enterprise associated with the user.

18. The method of claim 15 wherein the policy framework specifies any of access, authentication, and encryption technologies for each of the services.

19. The method of claim 12 wherein the services directory comprises a personalized directory corresponding to and configured by a specific user.

20. The method of claim 12 wherein the plurality of services are controlled by a plurality of independent service providers and employ a plurality of interfaces at least some of which are not directly interoperable.

21. The method of claim 12 further comprising facilitating copying of a previously created connector.

22. The method of claim 21 further comprising facilitating customization of the copied connector.

23. The method of claim 12 wherein the information for each selected connector includes at least one of use instructions, authentication information, an address of an interface operable to communicate with the selected connector, a message schema associated with the selected connector, and a web services description language (WSDL) file associated with the service corresponding to the selected connector.

24. The method of claim 12 wherein the connector design process comprises:
    specifying a connector name;
    specifying a connector address;
    specifying a connector type;
    specifying a post interface binding; and
    specifying the at least one business process.

25. The method of claim 24 wherein the connector address is on the services network.

26. The method of claim 24 wherein the connector address is on an enterprise network associated with a developer engaged in the connector design process.

27. The method of claim 24 wherein the connector type supports one of one-way messaging, two-way messaging, and both one-way and two-way messaging.

28. The method of claim 24 wherein the post interface binding corresponds to one of a SOAP interface, an FTP interface, an AS2 interface, a synchronous interface, an asynchronous interface, and a custom interface.

29. The method of claim 28 wherein the custom interface is specified by a developer engaged in the connector design process.

30. The method of claim 12 wherein each connector comprises at least one of an inbound mapping process and an outbound mapping process for mediating the business policy differences.

31. The method of claim 30 wherein the at least one of the inbound mapping process and the outbound mapping process resides in the services network.

32. The method of claim 30 wherein the at least one of the inbound mapping process and the outbound mapping process resides in an enterprise network associated with the corresponding service.

33. The method of claim 12 further comprising providing at least one connector template from which the new connector may be created.

34. The method of claim 12 wherein the new connector is not a SOAP connector, the method further comprising automatically generating a SOAP connector with reference to at least one schema file relating to the service corresponding to the new connector.

35. The method according to claim 12, further comprising:
    for each of selected ones of the connectors, providing access to a connector publishing process via the services directory, the connector publishing process allowing the connector to be published to the services directory such that the connector may be selected for use by one or more of a plurality of users of the services network.

* * * * *